Patented Mar. 21, 1939

2,151,364

UNITED STATES PATENT OFFICE 2,151,364

ANTHRAX VACCINE

Howard M. Winegarden, Oakland, Calif., assignor to Cutter Laboratories, Berkeley, Calif., a corporation of California No Drawing. Application June 2, 1937, Serial No. 146,005

4 Claims. (Cl. 167—78)

This invention relates in general to anthrax vaccines and in particular to an anthrax vaccine incorporated in an adsorptive material such as aluminum hydroxide.

It is common knowledge among individuals working with the control of anthrax among cattle, sheep, horses and other domestic animals that a good immunity is only obtained when strong anthrax vaccines are used. Generally speaking vaccines are prepared by cultivating anthrax organisms obtained from field cases under conditions adverse to the virulence of the strains being treated. One common method of producing strains suitable for vaccine work consists in incubating the cultures at an abnormally high temperature, such as 42° centigrade. The longer the strains are subjected to incubation at this temperature the weaker they become. On the basis of this method of attenuation a large series of vaccines have been prepared for immunizing purposes which vary greatly in their virulence. The longer a given strain is cultivated at this high temperature the weaker it becomes, and eventually it is possible to produce a culture which will not kill very susceptible laboratory animals even in large dosage. Such weakened strains are, however, usually very poor immunizing agents and it has been necessary for successful field results, to follow the injection of these very weak strains with vaccines prepared from less attenuated cultures of B. anthracis.

Cultures of B. anthracis readily tend to go into a sporulating or resting stage on incubation for several days, and since anthrax spores are very resistant to heat and other deleterious influences, they form an admirable source of material for vaccine preparation. Since strong anthrax spore vaccines are necessary to produce high immunity, and since these vaccines are in themselves dangerous to the more susceptible animals being vaccinated, it becomes necessary to first produce a low grade immunity with a safer, weaker spore vaccine, or as a second method to use anti-anthrax serum along with a strong vaccine, in order to avoid vaccination losses. An alternative method has recently been proposed in which an intensely irritating substance, such as saponin, is included with the anthrax spore vaccine, and which causes such an immediate and intense local reaction in the vaccinated animal that the vaccine, even though a very strong one, is localized and rendered comparatively safe for field inoculation.

It is among the objects of this invention to provide an anthrax vaccine incorporated in a highly adsorbent reagent such as aluminum hydroxide, which will serve to retard the diffusion of the active component of the vaccine into the body of a vaccinated animal and a method for producing such a vaccine.

More specifically the object of the invention is the provision of a strong anthrax spore vaccine incorporated in an adsorbent agent such as aluminum hydroxide and which may be given in a single injection.

Briefly a vaccine of this nature may be prepared by adsorbing most of the viable organisms contained in a saline anthrax spore suspension, in a gel of aluminum hydroxide. This may be accomplished by one of two methods. One method consists in adding a sterile solution of an alum such as sodium, potassium, or ammonium alum to the spore suspension and adjusting the hydrogen ion concentration of the resulting mixture to approximately the neutral point by the addition of a sterile solution of a base such as sodium hydroxide. During the addition of the latter reagent aluminum hydroxide is precipitated as a white flocculent mass which adsorbs most of the viable organisms contained in the original suspension. An alternative method consists in preparing the aluminum hydroxide gel separately from the spore suspension, sterilizing it by heat and then adding the sterilized gel in the desired quantities to the anthrax spore suspension.

A typical batch of alum treated anthrax spore vaccine was produced under my direction as follows: A suspension of anthrax vaccine spores in physiological salt solution was prepared which was uniformly fatal to guinea pigs in the dosage intended for field use but not to mature rabbits. To this saline suspension was added an equal amount of a sterile solution containing substantially 10% of ammonium alum (C. P.) The mixture was thoroughly shaken and then slowly and with constant agitation 10 normal sodium hydroxide solution was added until the hydrogen ion concentration of the mixture was between 6.0 and 7.0. Prepared suspensions of aluminum hydroxide may be used, as mentioned above, instead of the alum and sodium hydroxide treatment, and a sufficient quantity of the hydroxide gel added to a saline spore suspension to yield an aluminum content substantially equivalent to that in 5% ammonium alum.

The adsorptive properties of aluminum hydroxide gel for anthrax spores may be shown by plating out on a solid culture media such as rabbit blood agar, equal quantities of (a) the original saline spore suspension free of aluminum hydroxide, (b) the supernatant from the alum-treated spore suspension (the aluminum hydroxide gel will settle to somewhat less than one-half of the volume of the mixture) and (c) the thoroughly agitated hydroxide spore mixture. After the agar plates have been incubated for twenty-four hours, it will be found that the plant of the supernatant from the alum-treated spore suspension contains only a fraction of the organisms contained in the other two plants.

It is believed that the protective action of the aluminum hydroxide when added to strong anthrax spore vaccines lies in the ability of the former to adsorb most of the viable organisms present. This adsorption is probably not permanent and it is believed that a gradual release of the adsorbed spores into the system of the immunized animal produces an immunity at least as good as would be obtained with the unmodified strong anthrax vaccine spore suspension.

The adsorptive action or affinity of the aluminum hydroxide for the anthrax spores may be considered as opposed to the absorptive action of the body of the injected animal for the spores. However the absorptive action must of necessity overbalance the adsorptive action in order to permit the gradual diffusion of the vaccine into the body of the injected animal and the adsorptive material must be of such a nature as not to injure or attenuate the anthrax spores or injure the injected animal. Aluminum hydroxide has been found to meet all of these requirements.

Tests designed to show the safety and immunizing properties of anthrax spore vaccine incorporated in aluminum hydroxide as above prepared have been made on sheep. In one test five animals received 1 c. c. each of the vaccine and after about a four weeks' period were given injections of fully virulent anthrax spores. Two normal control animals were inoculated with the test antigen at the same time and both died of anthrax on the third day. None of the vaccinated animals died. It should also be mentioned that the vaccinated sheep showed almost no reaction at the site of injection following their inoculation with the vaccine.

Excellent results have been obtained with a vaccine having a final hydrogen ion concentration of 6.0 to 7.0 but this concentration is not critical for good results may be obtained with a final hydrogen ion concentration ranging from substantially 4.5 to 8.0

Also it is not necessary that the vaccine be prepared from a suspension of spores in a physiological salt solution for since anthrax spores are very stable a distilled water suspension can be used.

I claim:

1. A composition for injection purposes comprising viable anthrax spore material in a medium containing aluminum hydroxide.

2. The method of producing an anthrax vaccine which comprises preparing a suspension of anthrax spores of any desired virulence; adding to this suspension a sterile solution containing alum; and then adding a base until the hydrogen ion concentration of the mixture is between 4.5 and 8.0.

3. The method of producing an anthrax vaccine which comprises preparing a suspension of anthrax spores in physiological salt solution which is uniformly fatal to guinea pigs in the dosage intended for field use but not to mature rabbits, and then adding to this suspension a sufficient quantity of aluminum hydroxide gel to yield an aluminum content substantially equivalent to that in 5% ammonium alum.

4. An anthrax vaccine comprising viable anthrax spore material incorporated with any reagent selected from the group comprising alum and aluminum hydroxide.

HOWARD M. WINEGARDEN.